United States Patent [19]

Niemiro

[11] 4,207,003
[45] Jun. 10, 1980

[54] SENSING DEVICE FOR INK FILM THICKNESS IN PRINTING PRESSES

[75] Inventor: Thaddeus A. Niemiro, Lisle, Ill.

[73] Assignee: Rockwell International Corporation, Pittsburgh, Pa.

[21] Appl. No.: 961,345

[22] Filed: Nov. 16, 1978

[51] Int. Cl.$^2$ .................. G01B 11/06; G01N 21/22
[52] U.S. Cl. ................................ 356/382; 356/435
[58] Field of Search .......................... 356/381–382, 356/435, 448, 432; 250/560, 571

[56] References Cited

U.S. PATENT DOCUMENTS

| | | | |
|---|---|---|---|
| 1,848,874 | 3/1932 | Fitzgerald | 356/432 |
| 2,232,622 | 2/1941 | Moses et al. | 250/571 |
| 3,330,961 | 7/1967 | Juengst et al. | 250/571 |
| 3,684,889 | 8/1972 | Priessnetz et al. | 250/271 |
| 3,707,123 | 12/1972 | Heasman et al. | 101/207 |
| 3,756,725 | 9/1973 | Manring | 356/448 |
| 3,970,393 | 7/1976 | Krygeris et al. | 356/435 |

*Primary Examiner*—John K. Corbin
*Assistant Examiner*—William H. Punter

[57] ABSTRACT

A device for detecting changes in ink film thickness on the inking rollers of a printing press which includes a transfer wheel rotatable mounted in nipping contact with one of the inking rollers. A rotatable gauge wheel having a slinger ring assembled intermediate its ends and about its periphery defines a measuring surface on one side of the ring for receiving a film of ink from the transfer wheel and the other side defines a reference surface maintained clear of ink by the ring. Individual photo-electric sensing members are tangentially associated with the peripheral surface of both the measuring and reference surfaces and by means of a cooperating circuit including a comparetor a signal change is given when a difference in ratio occurs between pre-selected signals from these surfaces.

3 Claims, 5 Drawing Figures

SENSING DEVICE FOR INK FILM THICKNESS IN PRINTING PRESSES

BACKGROUND OF THE INVENTION

The invention pertains to a sensing device for indicating changes in ink film thickness on the ink transfer rollers of a printing press and more particularly to a device utilizing a circuit having a pair of spaced light emitting diodes disposed in operative association with a measuring and reference surface formed by a division of the periphery of a guage wheel. The difference between the signals obtained from each of these surfaces through their respective light emitting diode is completed to provide a resultant signal proportional to the thickness of the ink film.

U.S. Pat. No. 3,707,123 discloses an apparatus for detecting changes in thickness of ink film on the roller system of a printing press which utilizes a pair of photocells. One of these photocells is disposed within a transparent roller that is in contact with a printing press roller and serves to generate a film thickness signal while the other serves to generate a reference signal.

Other U.S. patents show and describe devices that utilize light rays to measure the thickness of sheet materials, and for reference to the teachings of such disclosures, attention is hereby directed to U.S. Pat. Nos. 1,963,128 and 3,518,441.

The present invention provides an improved means for measuring the ink film thickness on the inking rollers of a printing press, for the reference and measuring surfaces are formed on the same base of a rotatable gauge wheel that is disposed in operative association with said inking roller thereby causing all variables to remain constant. In other words, with these surfaces having a common base portion, any difference due to expansion, contraction, out-of-roundness, etc., will have no affect on the thickness measurement of the ink film.

SUMMARY OF THE INVENTION

The ink film thickness measuring apparatus of the present invention defines a unit having a pair of spaced side plates between which a transfer wheel and gauge wheel are rotatably mounted. The unit is mounted on a cross member of a printing press in a manner whereby the transfer wheel is rotated by and is adopted to receive a film of ink from one of the ink transfer rollers of the press. The gauge wheel is provided intermediate its ends with a ring element which forms a reference surface on one side of said ring and a measuring surface on the opposite side. The measuring surface side of the gauge wheel is disposed in nipping relation with the transfer wheel which is effective in rotating said gauge wheel and depositing a film of ink onto the measuring surface while the reference surface is maintained clear of ink by the ring element.

The unit includes a circuit having two light emitting diodes mounted in spared relation adjacent one side of the gauge wheel and in operative alignment with each diode a photo-detector is mounted adjacent the opposite side of said gauge wheel. The beam from one diode coacts with the reference surface to provide a base signal and the beam from the other coacts with the inked or measuring surface with the difference between the two signals being computed to provide a resultant signal proportional to the thickness of the ink film.

By any suitable indicating means any change in ink film thickness on the measuring surface is immediately indicated when a difference in ratio occurs between pre-selected signals from the measuring and reference surfaces.

It is therefore a principal object of the invention to provide an improved device for monitoring the ink film thickness on the inking rollers of a printing press which combines simplicity of construction and operation to obtain operational reliability.

A further object of the invention is to provide an improved device for monitoring ink film thickness on the roller system of a printing press which will instantly detect and indicate any changes in thickness that should vary from a pre-selected amount.

A further and more specific object of the invention is to provide a device for monitoring ink film thickness on the inking rollers of a printing press having a reference and a measuring surface formed on a common base element whereby all possible variances in said surfaces remain constant.

These and other objects of the invention will become more fully apparent by reference to the appended claims and as the following detailed description proceeds in reference to the figures of drawing wherein:

DESCRIPTION OF THE PREFERRED EMBODIMENT

Now referring to the figures of drawing enough of a printing press is shown in the various figures to serve as a basis for a detailed description of the invention applied thereto.

Figure 1:
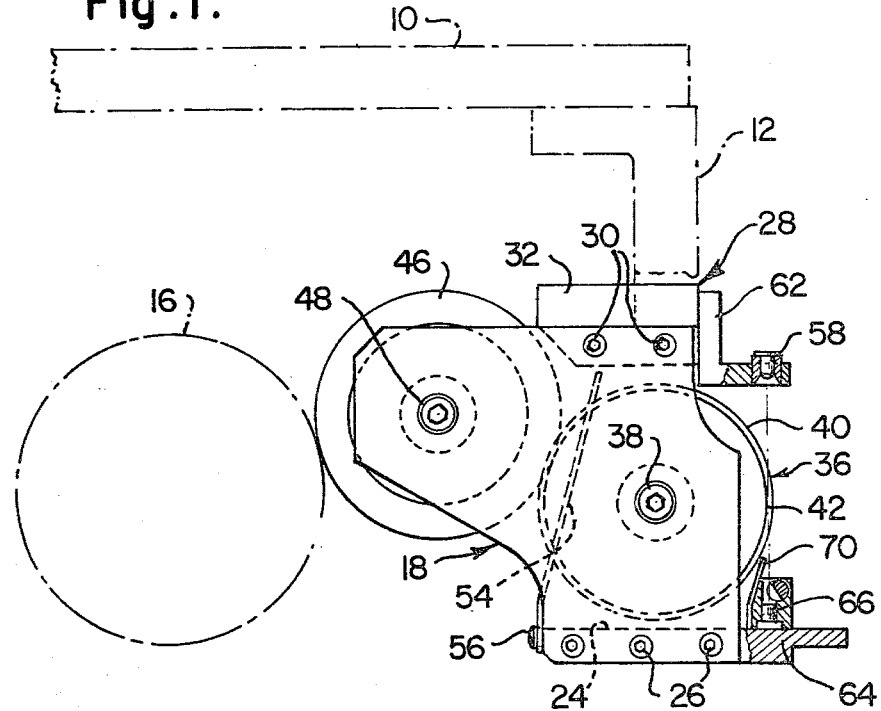
FIG. 1 is a view in side elevation of a portion of a printing press showing the sensing device according to the invention applied thereto.
Figure 2:
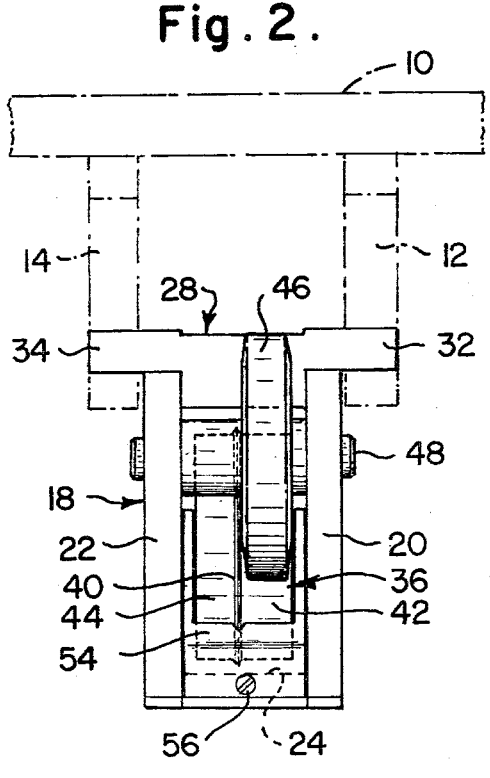
FIG. 2 is a view in end elevation as seen looking from the left in FIG. 1.
Figure 3:
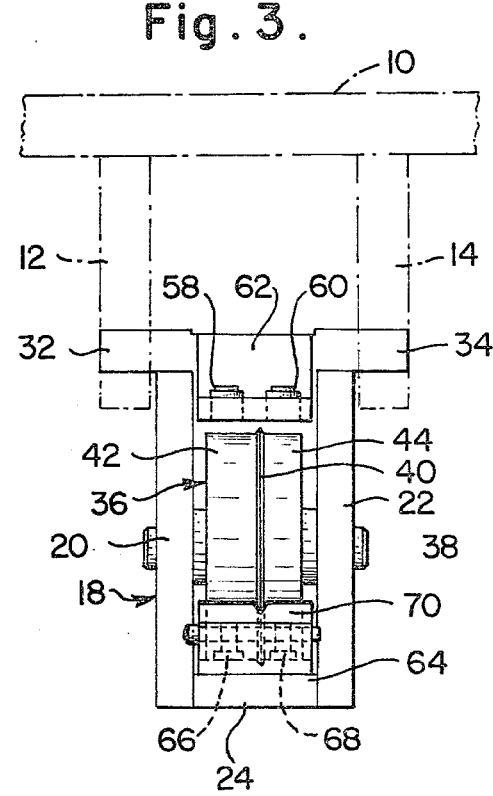
FIG. 3 is a view similar to FIG. 2 but as seen looking from the right in FIG. 1.

In FIGS. 1, 2, and 3 one of the cross members which interconnects the side frames of a printing press is shown and identified by numeral 10. A pair of depending support brackets 12 and 14 attached by any suitable means (not shown) to the underside of the cross member 10 provides a means for supporting the sensing device of the present invention in operative association with one of the presses' inking rollers 16.

The sensing device comprising the invention is identified generally by numeral 18 and includes among its various parts a pair of spaced side plates 20 and 22 which are interconnected at their lower ends by a plate member 24 assembled therebetween by cap screws 26 (FIG. 1). These side plates 20 and 22 are interconnected at their upper ends by a cover plate generally indicated by numeral 28 which assembles intermediate said plates by means of cap screws 30 (FIG. 1). The cover plate 28 extends above the upper ends of the side plates 20 and 22 and includes integrally formed projections 32 and 34 which engage and extend outwardly beyond said side plates. That portion of the projections 32 and 34 extending beyond the side plates 20 and 22 respectively serve as a means for attaching the device to the depending support brackets 12 and 14.

A gauge roller identified generally by numeral 36 is rotatably supported intermediate the side slates 20 and 22 on a shaft 38 which is journalled adjacent each end in aligned openings provided in said side plates. This gauge roller 36 is divided into two zones or surfaces by means of a ring 40 which is fixedly disposed intermediate the ends of said roller and which extends about the entire circumference thereof. The surface on one side of the ring 40 defines a measuring surface depicted by numeral 42 and the opposite side thereof defines a reference surface identified by numeral 44.

An ink transfer roller 46 is also rotatably supported intermediate the side plates 20 and 22 on a shaft 48 which is journalled adjacent each end in aligned openings provided in said side plates. This ink transfer roller 46 is supported at a location between the side plates so that a substantial portion of its peripheral surface protrudes outwardly beyond said plates.

Figure 4:
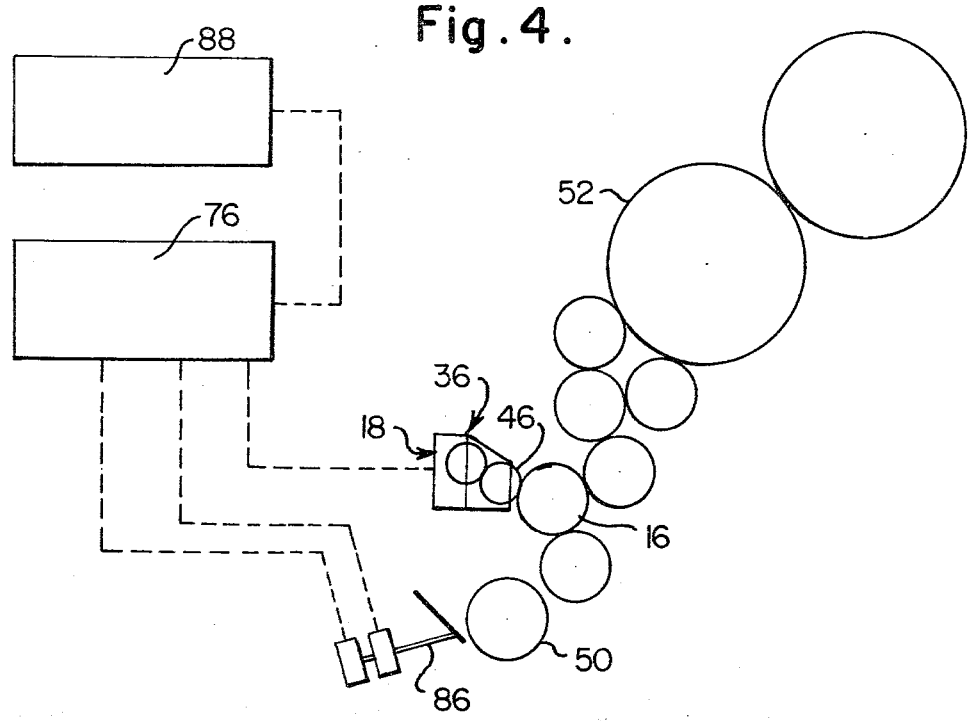
FIG. 4 is a schematic view showing the device according to the invention and its association with various elements of a printing press.

As shown in FIGS. 1 and 4, the ink transfer roller 46 is in nipping contact with the presses' inking roller 16 and also with the measuring surface 42 of the gauge wheel 36.

As the inking roller 16 cooperate in a known manner with other inking rollers, to transfer ink from a fountain roller 50 to a plate cylinder 52 (FIG. 4), the transfer roller 46 is effective in receiving a film of ink from said inking roller 16 and transferring the same onto the measuring surface 42 of the gauge roller 36. The film of ink deposited onto the measuring surface 42 is equivalent in thickness to that being transferred by the inking rollers. The reference surface 44 is maintained clear of the ink film by the ring 40 which provides a definite separation between both surfaces and functions like that of a slinger element. Additionally to provide further control of the ink film, such for example as reducing the possibility of contamination by foreign matter as well as confining whatever ink mist that may form during transfer of said film, a generaly U-shaped baffle 54 is provided. This baffle is assembled to the device so that the leg portions thereof extend generally upwardly in close proximity with each side of the gauge roller 36 and with the lower end attached to the plate member 24 by means of a screw 56.

The means for sensing the thickness of the ink film on the measuring surface 42 includes a circuit having two light emitting diodes 58 and 60 (FIGS. 1 and 3) mounted on a support bracket 62 that is suitably fixed to the cover plate 28. In operative alignment with each diode 58 and 60 a photo-detector is mounted adjacent the opposite side of the gauge wheel on an extension 64 of the plate member 24. These photo-detectors are identified by numerals 66 and 68 and are disposed in operative alignment with diodes 58 and 60 respectively.

The beam from diode 60 coacts with the reference surface 44 to provide a base signal and the beam from the diode 58 coacts with the inked or measuring surface 42 and the difference between the two signals is computed to provide a resultant signal proportional to the thickness of the ink film.

As shown in FIGS. 1 and 3, the device is provided with a second baffle 70 which serves to shield the photo-detectors 66 and 68 from the accumulation of ink which would interfere with their intended function.

The light source or beams from the two diodes 58 and 60 are pulse timed by an oscillator or any other suitable timing device (not shown) and are received by the photo-detectors 66 and 68 respectively. Photo-detector 68 is effective in sensing the reference surface 44 of the gauge wheel and detector 66 the measuring surface 42 of said wheel.

Figure 5:
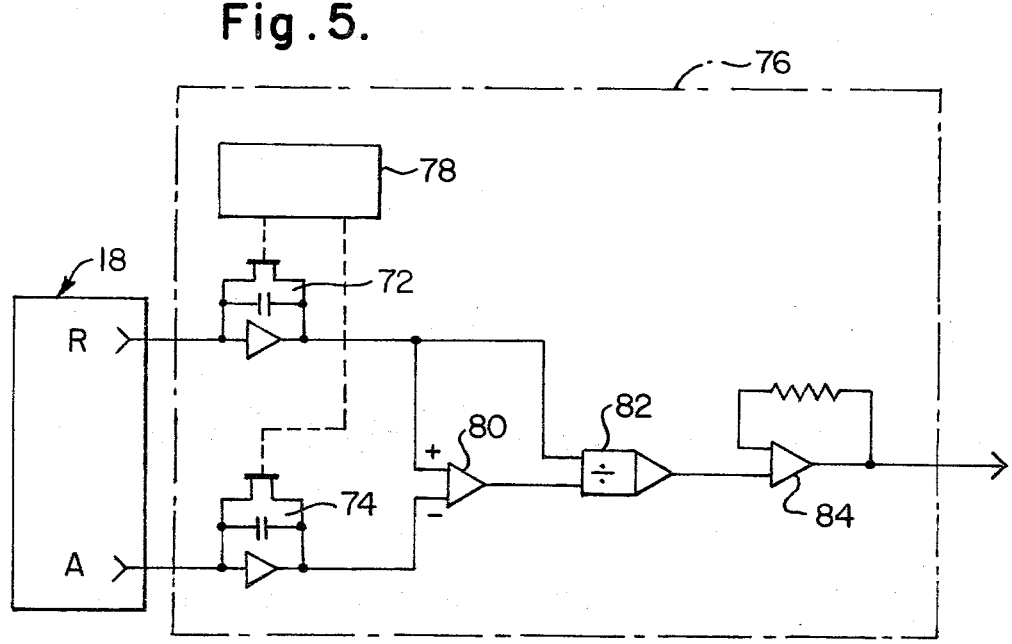
FIG. 5 is a schematic view of the control circuit for the sensing device.

With reference to FIG. 5, R designates a reference voltage signal and A designates a voltage signal inversely proportional to the ink film thickness on the measuring surface 42 of the gauge roller 36. Each signal pulse is integrated and held until sampling gates 72 and 74, within a controller 76, controlled by a timing circuit 78 is opened to a subtracting circuit 80 and then a dividing circuit 82. The resulting function of this timing is $(1-A/R)$ and is proprotional to the ink film thickness on the measuring surface 42 of the gauge roller 36. The signal is further amplified at 84 and calibrated to a linear reading of 2 volts per 0.001 inch of ink thickness.

Although the invention has been shown and described as being located in a fixed position on a printing press, it can be mounted in combination with any suitable travering apparatus and caused to transverse the width of the press so as to successively monitor the ink film thickness corresponding to each ink fountain key 86 (FIG. 4).

The signal from the sensing device 18 is compared with a command signal 88 for a given key and if the algebraic sum of the two is not equal to zero, the controller 76 actuates a key setting motor (not shown) to effect movement of the key by an amount proportional to the signal difference. This method of control requires a calibration of ink thickness on the selected inker roller with a mechanical setting of the ink fountain key 86.

Another method of controlling the sensing device is by means of a closed loop key setting control. With such a control the device can be caused to index between successive keys and remain at a particular key position until the algebraic sum of the command signal and film thickness signal is equal to zero.

Although the present invention has been described in connection with a preferred embodiment, it is to be understood that modifications and variations may be resorted to without departing from the spirit and scope of the invention as those skilled in the art will readily understand. Such modifications and variations are considered to be within the purview and scope of the invention and the appended claims.

I claim:

1. An apparatus for measuring the ink film thickness being transmitted from the fountain to the plate cylinder by the roller mechanism in a printing press, said apparatus comprising:
   (a) a transfer wheel rotatably mounted in contiguous relation with one of the rollers of the roller mechanism for receiving a film of ink being advanced thereby;
   (b) a rotatably mounted gauge wheel including:
      (i) a circumferential measuring surface defining a portion of the width of said gauge wheel disposed in nipping relation with said transfer wheel for receiving a film of ink therefrom;
      (ii) a circumferential reference surface extending from said measuring surface for the remainder of the width of said gauge wheel;
   (c) sensing means defining a light emitting diode and cooperating photo-detector diode tangentially associated with the peripheral surface of each said measuring and reference surface; and
   (d) circuit means connected to said sensing means including a comparitor for signaling a change in a pre-selected ratio between sensing signals derived from said measuring and reference surfaces.

2. The apparatus according to claim 1 wherein said rotatably mounted gauge wheel includes means for separating the measuring surface from the reference surface to prevent cross radiation from the light emitting diodes and to restrict reception of the ink film to said measuring surface.

3. The apparatus according to claim 2 wherein said separating means defines a ring member attached intermediate the ends and about the peripheral surface of said guage wheel.

* * * * *